US008094812B1

(12) United States Patent
Tsang et al.

(10) Patent No.: US 8,094,812 B1
(45) Date of Patent: Jan. 10, 2012

(54) UPDATING STORED PASSWORDS

(75) Inventors: Andy Tsang, San Jose, CA (US); Roger A. Chickering, Granite Bay, CA (US); Clifford E. Kahn, Lexington, MA (US); Jeffrey C. Venable, Sr., Union City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1103 days.

(21) Appl. No.: 11/864,598

(22) Filed: Sep. 28, 2007

(51) Int. Cl.
*H04K 1/00* (2006.01)
(52) U.S. Cl. .......................... 380/28; 713/184
(58) Field of Classification Search .............. 380/28, 380/59; 726/2, 5, 27; 713/182, 183, 184, 713/185
See application file for complete search history.

(56) References Cited

U.S. PATENT DOCUMENTS

| | | | | |
|---|---|---|---|---|
| 5,982,898 A * | 11/1999 | Hsu et al. ................ | 713/156 |
| 6,064,736 A * | 5/2000 | Davis et al. ............... | 713/155 |
| 6,697,864 B1 * | 2/2004 | Demirtjis et al. .......... | 709/229 |
| 6,829,242 B2 * | 12/2004 | Davison et al. ............ | 370/401 |
| 6,865,681 B2 * | 3/2005 | Nuutinen ................... | 726/14 |
| 7,055,032 B2 * | 5/2006 | Sandhu et al. ............. | 713/171 |
| 7,100,054 B2 * | 8/2006 | Wenisch et al. ............ | 713/185 |
| 7,231,517 B1 * | 6/2007 | Mashayekhi ............... | 713/167 |
| 7,277,421 B1 * | 10/2007 | Pershan ...................... | 370/352 |
| 7,318,152 B2 * | 1/2008 | Haney ........................ | 713/153 |
| 7,453,827 B2 * | 11/2008 | Toyoda ....................... | 370/260 |
| 7,549,048 B2 * | 6/2009 | Freeman et al. ........... | 713/171 |
| 7,660,298 B2 * | 2/2010 | Stanford .................... | 370/352 |
| 7,945,779 B2 * | 5/2011 | Martin ....................... | 713/170 |
| 2003/0172090 A1 * | 9/2003 | Asunmaa et al. .......... | 707/200 |
| 2004/0008666 A1 * | 1/2004 | Hardjono .................. | 370/352 |
| 2004/0013108 A1 * | 1/2004 | Ruckstuhl .................. | 370/352 |
| 2004/0019778 A1 * | 1/2004 | Gere ........................... | 713/2 |
| 2004/0111620 A1 * | 6/2004 | Saunders et al. .......... | 713/182 |
| 2004/0117489 A1 * | 6/2004 | Harmon et al. ............ | 709/229 |
| 2004/0208175 A1 * | 10/2004 | McCabe ...................... | 370/389 |
| 2005/0055577 A1 * | 3/2005 | Wesemann et al. ........ | 713/201 |
| 2005/0078691 A1 * | 4/2005 | Davison et al. ............ | 370/401 |
| 2005/0100047 A1 * | 5/2005 | Liu et al. ................... | 370/466 |
| 2005/0114367 A1 * | 5/2005 | Serebrennikov .......... | 707/100 |
| 2005/0259637 A1 * | 11/2005 | Chu et al. .................. | 370/352 |
| 2005/0286519 A1 * | 12/2005 | Ravikumar et al. ........ | 370/389 |
| 2006/0041751 A1 * | 2/2006 | Rogers et al. .............. | 713/171 |
| 2006/0048213 A1 * | 3/2006 | Cheng et al. ............... | 726/5 |
| 2006/0056392 A1 * | 3/2006 | Wang ......................... | 370/352 |
| 2006/0126596 A1 * | 6/2006 | Shieh et al. ................ | 370/352 |
| 2006/0129807 A1 * | 6/2006 | Halasz et al. .............. | 713/163 |
| 2006/0165060 A1 * | 7/2006 | Dua ............................ | 370/352 |

(Continued)

*Primary Examiner* — Michael Pyzocha
*Assistant Examiner* — Abu Sholeman
(74) *Attorney, Agent, or Firm* — Harrity & Harrity, LLP

(57) ABSTRACT

A device may include an authentication server and a server. The authentication server may receive a first form of a password from a client device in accordance with an authentication protocol, and authenticate the client device based on a comparison of the first form to a value derived from a second form of the password stored in a password database, where the comparison fails when the first form is not comparable to a value derived from the second form. The server may establish a secure connection to the client, receive a plain-text password from the client device over the secure connection, authenticate the client device by comparing a value derived from the plain-text password with a value derived from the second form, and update the password database with a third form of the password that permits the authentication server to successfully authenticate the client device when the authentication server receives the first form.

18 Claims, 8 Drawing Sheets

U.S. PATENT DOCUMENTS

| | | |
|---|---|---|
| 2006/0184651 A1* | 8/2006 | Tirnumala .................... 709/220 |
| 2006/0190719 A1* | 8/2006 | Rao et al. ...................... 713/160 |
| 2006/0233328 A1* | 10/2006 | Radziewicz et al. ....... 379/88.25 |
| 2006/0242241 A1* | 10/2006 | Tock et al. .................... 709/206 |
| 2006/0245435 A1* | 11/2006 | Sajassi .................... 370/395.53 |
| 2006/0245571 A1* | 11/2006 | Radziewicz et al. ..... 379/220.01 |
| 2006/0291639 A1* | 12/2006 | Radziewicz et al. ..... 379/211.01 |
| 2007/0008924 A1* | 1/2007 | Moran .......................... 370/331 |
| 2007/0011731 A1* | 1/2007 | Le et al. .......................... 726/11 |
| 2007/0147318 A1* | 6/2007 | Ross et al. .................... 370/338 |
| 2007/0266258 A1* | 11/2007 | Brown et al. ................. 713/183 |
| 2007/0269041 A1* | 11/2007 | Bhatnagar et al. ............. 380/30 |
| 2008/0065880 A1* | 3/2008 | Martin .......................... 713/156 |
| 2008/0155227 A1* | 6/2008 | Sinclair et al. ............... 711/209 |
| 2008/0313455 A1* | 12/2008 | Kroeselberg .................. 713/153 |
| 2008/0313721 A1* | 12/2008 | Corella ............................. 726/6 |

* cited by examiner

UPDATING STORED PASSWORDS

BACKGROUND

A network device that is connected to a communication port of a network access device (NAD) may be granted a point-to-point connection to a network if an authentication of the network device succeeds. The network device may be upgraded to support more advanced authentication hardware and/or software.

SUMMARY

According to one aspect, a device may include an authentication server and a server. The authentication server may receive a first form of a password from a client device in accordance with an authentication protocol, and authenticate the client device based on a comparison of the first form to a value derived from a second form of the password stored in a password database, where the comparison fails when the first form is not comparable to a value derived from the second form. The server may establish a secure connection to the client, receive a plain-text password from the client device over the secure connection, authenticate the client device by comparing a value derived from the plain-text password with a value derived from the second form, and update the password database with a third form of the password that permits the authentication server to successfully authenticate the client device when the authentication server receives the first form.

According to another aspect, a method may include receiving a first form of a password from a client device, retrieving a second form of the password from a password database, deriving a value from the second form, comparing the first form to the derived value, establishing a secure connection to the client device, receiving a plain-text password from the client device over the secure connection, authenticating the client device by comparing a value derived from the plain-text password with a value derived from the second form; and replacing the second form in the password database with a third form that permits the client device to be authenticated based on the first form of the password.

According to yet another aspect, a device may include means for receiving a first form of a password, means for authenticating a client device by comparing a value derived from the first form with a value derived from a second form, means for establishing a connection that includes the client device as one endpoint when the client device cannot be authenticated based on the first form, means for receiving the plain-text password from the client device over the connection, means for authenticating the client device by comparing a value derived from the plain-text password with the value derived from the second form, means for overwriting the second form in a password database with a third form, means for subsequently receiving the first form of the password, means for comparing the first form to a value derived from the third form in the database, means for successfully authenticating the client device based on the comparison.

DETAILED DESCRIPTION OF PREFERRED EMBODIMENTS

The following detailed description refers to the accompanying drawings. The same reference numbers in different drawings may identify the same or similar elements.

The term "authentication," as used herein, may refer the act of establishing, verifying, or confirming the identity of a client device or a user of the client device.

The term "virtual local area network (VLAN)," as used herein, may refer to a logical network within a physical network. A VLAN may include a network of hosts, computers, or other devices that behave as if they are connected to the same portion or segment of the physical network.

The term "cleartext" or "plain-text," as used herein, may refer to a message or data that is in a form readily comprehensible to a human being without additional processing.

The term "hash," as used herein, may refer to a message or data that is encoded, cryptographically hashed, and/or encrypted. The term "hashed password," as used herein, may refer the result of applying an encryption, encoding, and/or cryptographic hashing to a plain-text password.

As used herein, depending on context, a password may be a plain-text password or a hashed password.

The term "old hash," as used herein, may refer to a hashed password that is generated by a device prior to upgrading the scheme that is used by the device to generate hashes. The term "new hash," as used herein, may refer to a hashed password that is generated by the device after the upgrade. An old hash may or may not refer to a plain-text password.

The term "IEEE 802.1X" or "802.1x," as used herein, may refer to a standard set by the Institute of Electrical and Electronics Engineers (IEEE). The standard may provide for an authentication protocol for a device that is seeking a point-to-point connection to a network, based on the Extensible Authentication Protocol (EAP).

Figure 1:
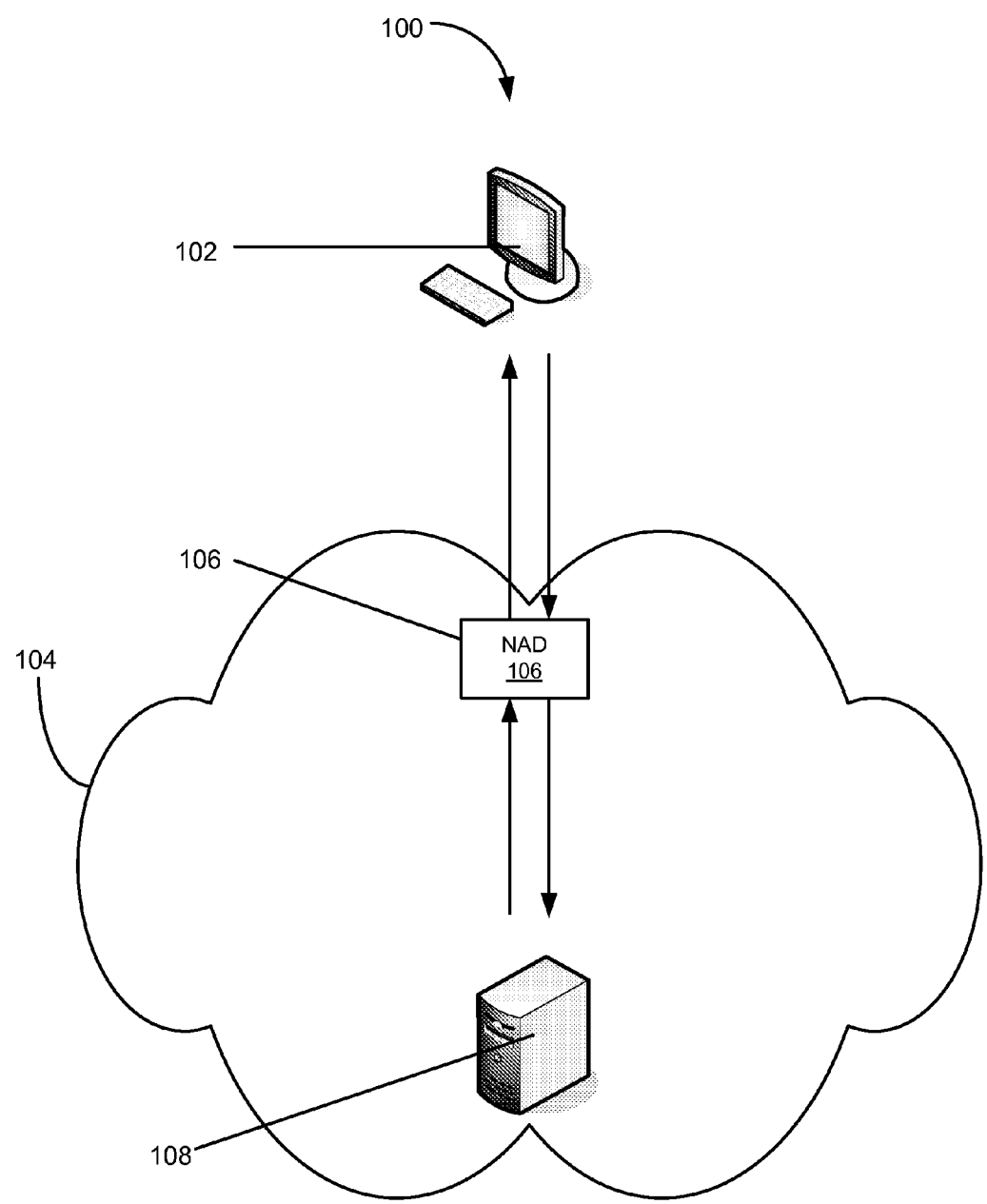
FIG. 1 is a diagram of an exemplary system in which the concepts described herein may be implemented.

In the following description, after a client device upgrades its password generating component, hashed passwords that are stored at a policy server device may be updated. FIG. 1 is a diagram of a system 100 in which the concepts described herein may be implemented. As shown, system 100 may include a client device 102, a network 104, and a network access device (NAD) 106. Depending on implementation, network 100 may include additional, fewer, or different components than those illustrated in FIG. 1. For instance, network 100 may include multiple client devices and/or NADs.

Client device 102 may include a computational and/or communication device, such as a personal computer, a laptop, an electronic notepad, a personal digital assistant (PDA), or another type of computational or communication device that includes a browser or a client application that can communicate with a server. Network 104 may include the Internet, an ad hoc network, a local area network (LAN), a wide area network (WAN), a metropolitan area network (MAN), a cellular network, a public switched telephone network (PSTN), any other network, or a combination of networks. NAD 106 may include a device that selectively permits other devices that are outside of network 104 to access network 104, in accordance with instructions or communication messages from policy server device 108. Policy server device 108 may include a device for managing access to network 104 and for administering authentication, authorization, and/or accounting (AAA).

In FIG. 1, upgrading a password generating component of client device may result in changing client device 102's scheme for generating a hash based on a plain-text password. Consequently, after the upgrade, when client device 102 is required to provide a password to policy server device 108 to gain access to network 104, client device 102 may send a new hash to policy server device 108. When policy server device 108 cannot authenticate client device 102 because the hash has changed, policy server device 108 may allow client device 102 to send the plain-text password. If policy server device 108 can authenticate client device 102 by comparing an old hash that is determined based on the plain-text password to a hash retrieved from a password database, policy server device 108 may update the password database. Updating the password database may permit policy server device 108 to thereafter authenticate client device 102 based on the new hash.

In the above, the server-side mechanism for receiving a plain-text password, authenticating the client device based on the plain-text password, and upgrading the password database may be constructed using server applications and components, such as a telnet server, a web server (e.g., Apache web server), and/or other types of server-side resources (e.g., a login script, a web page, etc.). By using these server applications and resources, the mechanism may be implemented inexpensively.

If a mechanism different from the one described above is used to update the password database, a policy server device may need to recognize when a client device upgrades its password generating component and use information related to old hashes. Implementing such mechanisms may entail writing complex server-side software.

Figure 2:
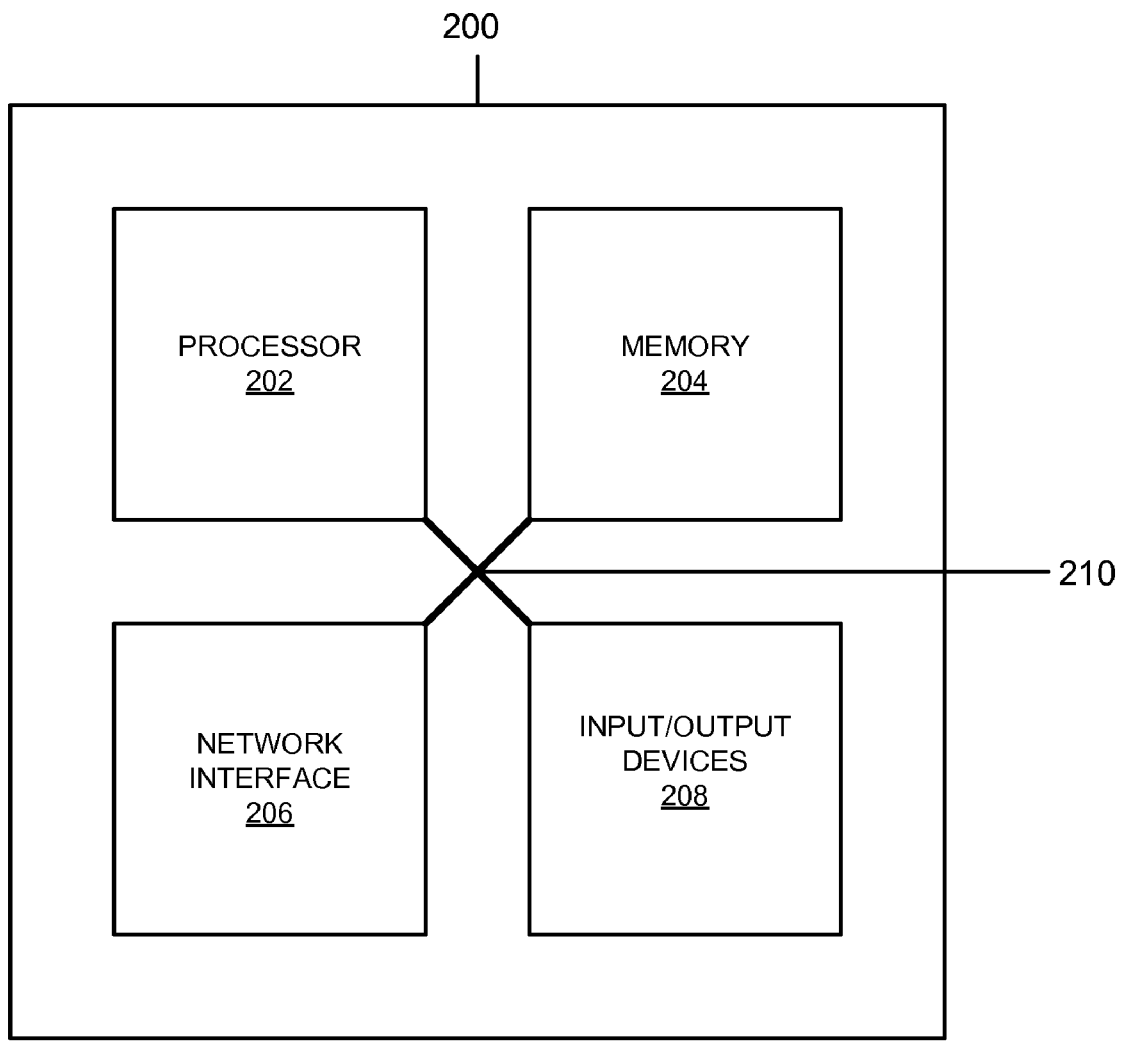
FIG. 2 is a block diagram of an exemplary network device.

FIG. 2 is a block diagram of a network device 200 that may represent client device 102, NAD 106, and/or policy server device 108. As shown, network device 200 may include a processor 202, a memory 204, a network interface 206, and/or input/output devices 208 connected via one or more communication paths 210.

Processor 202 may include one or more processors or microprocessors, and/or processing logic capable of controlling network device 200. Memory 204 may include static memory, such as a read only memory (ROM), and/or a dynamic memory, such as a random access memory (RAM), an onboard cache, etc., for storing data and machine-readable instructions. Memory 204 may also include storage devices, such as a floppy disk, compact disk (CD), and/or flash memory, as well as other types of storage devices.

Network interface 206 may include any transceiver-like mechanism that enables network device 200 to communicate with other devices and/or systems. For example, network interface 206 may include mechanisms for communicating with other devices on a network. Additionally or alternatively, network interface 206 may include an Ethernet interface and/or an interface/connection for connecting network device 200 to other devices (e.g., a wireless interface).

Input/output (I/O) devices 208 may include a display (e.g., a LCD, a cathode ray tube (CRT) display, etc.), a mouse, a speaker, a Digital Video Disk (DVD) writer, a DVD reader, Universal Serial Bus (USB) lines, and/or other types of devices for converting physical events or phenomena to and/or from digital signals that pertain to network device 200. Communication paths 210 may provide an interface through which components of network device 200 can communicate with one another.

In FIG. 2, each of the components (e.g., processor 202, memory 204, etc.) may be implemented or configured differently, depending on whether network device 200 is implemented as client device 102, NAD 106, or policy server device 108. For example, if network device 200 is implemented as client device 102, input/output devices 208 may include a liquid crystal display (LCD), a keyboard, a mouse, etc. In another example, if network device 200 is implemented as policy server device 108, input/output devices 208 may include a specialized storage device for fast data access.

Figure 3:
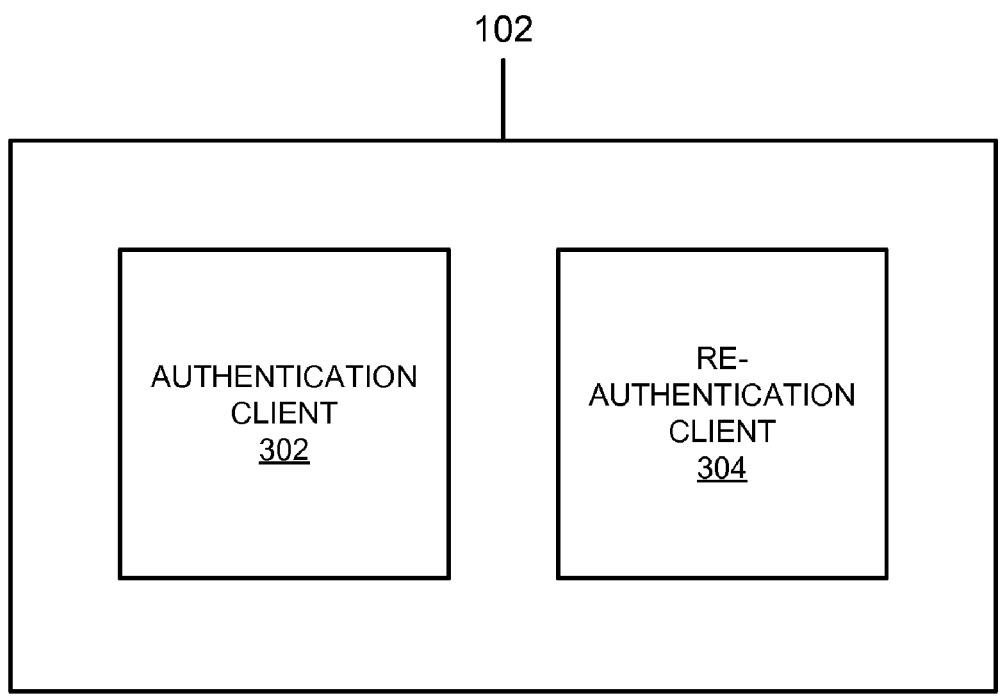
FIG. 3 is a functional block diagram of a client device of FIG. 1.

FIG. 3 is a functional block diagram of exemplary client device 102. As shown, client device 102 may include an authentication client 302 and a re-authentication client 304. Depending on implementation, client device 102 may include fewer, additional, or different components than those illustrated in FIG. 3.

Authentication client 302 may include hardware and/or software for generating and sending a plain-text or a hashed password in accordance with a specific authentication protocol. Authentication client 302 may prompt the user for the password, retrieve the password from storage, or retrieve the password from other software running on client device 102. Examples of the specific authentication protocol may include a challenge-handshake authentication protocol (CHAP), a Microsoft (MS) CHAP (MSCHAP), MSCHAP Version 2 (MSCHAPv2), etc. Re-authentication client 304 may include hardware and/or software for generating/obtaining and sending a plain-text password. Re-authentication client 304 may send the plain-text password in a specific format (e.g., Hyper-Text Markup Language (HTML)) and/or in accordance with a specific communication protocol (e.g., Hyper-Text Transfer Protocol (HTTP)). Examples of re-authentication client 304 may include a telnet client, a web browser, etc.

Figure 4:
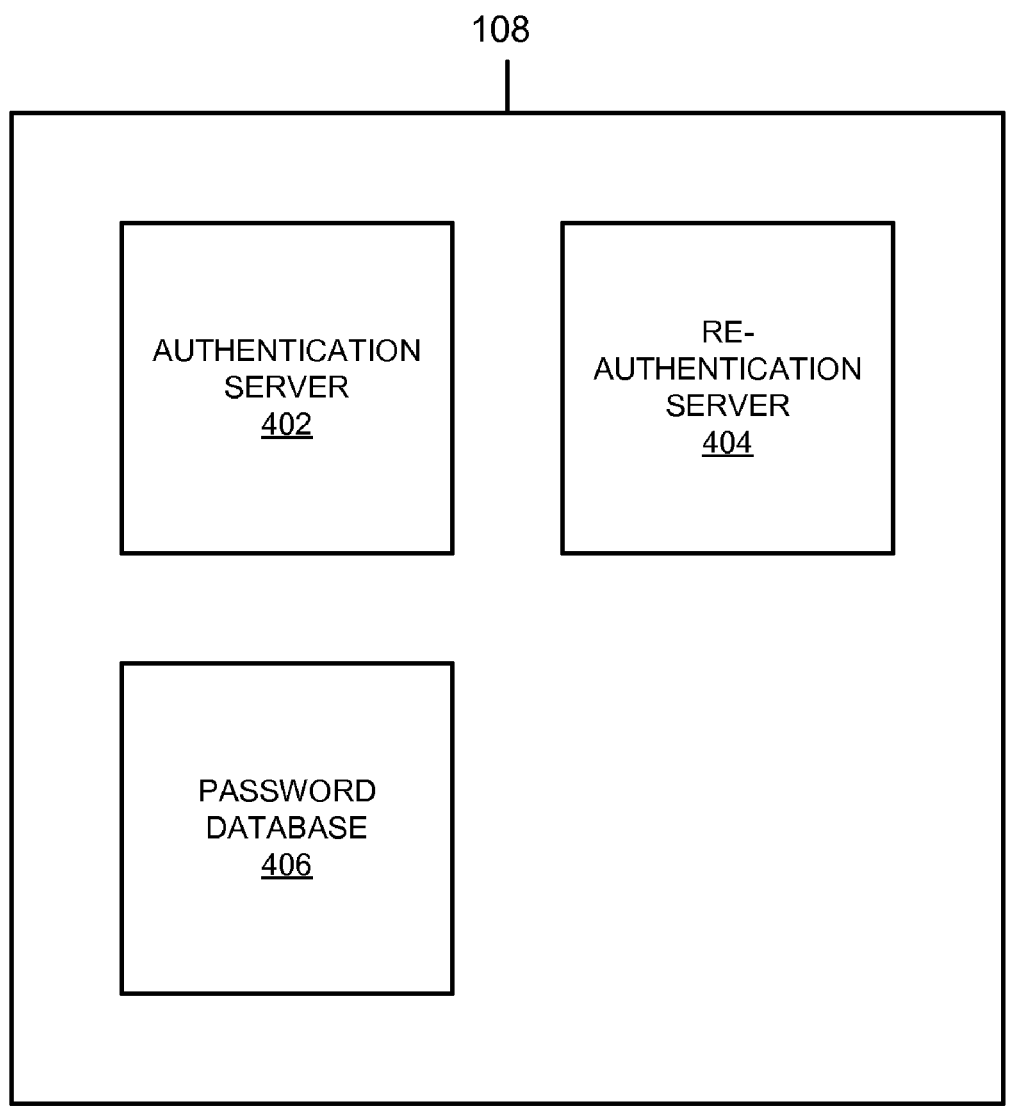
FIG. 4 is a functional block diagram of a policy server device of FIG. 1.

FIG. 4 is a functional block diagram of policy server device 108. As shown, policy server device 108 may include an authentication server 402, a re-authentication server 404, and a password database 406. Depending on implementation, policy server device 108 may include additional, fewer, or different components than those illustrated in FIG. 4 in various configurations. For example, policy server device 108 may include additional components that pertain to accounting functions. In another example, components that are illustrated in FIG. 4 may be distributed over multiple network devices.

Authentication server 402 may include hardware and/or software for performing authentication in accordance with a specific protocol (e.g., Remote Authentication Dial-In User Service (RADIUS) protocol, Diameter protocol, etc.). In performing the authentication, authentication server 402 may compare a hash from client device 102 to a value derived from a stored value. The stored value may be retrieved from password database 406. The authentication may succeed if the hash in the message and the derived value are identical.

Re-authentication server 404 may include hardware and/or software for providing client device 102 with a capability to send a plain-text password to policy server device 108 when authentication server 402 fails to authenticate client device 102. In one example, policy server device 108 may place client device 102 on a quarantine VLAN and allow client device 102 to send the plain-text password to the re-authentication server via a browser over the VLAN.

When re-authentication server 404 receives the plain-text password from client device 102 over the quarantine VLAN, re-authentication server 404 may compare a value derived from the plain-text password with a value derived from a stored value retrieved from password database 406. If the authentication succeeds (e.g., the value derived from the plain-text password is identical to the value derived from the value stored in database 406), re-authentication server 404 may update password database 406 or cause password database 406 to be updated. The update may replace the hash with a new hash in password database 406. The reason it may be possible for re-authentication server 404 to authenticate the user when authentication server 402 was unable to is that re-authentication server 404 has received the user's plain-text password and can thus compute a value from the plain-text password which can be compared to the value stored in password database 406.

Password database 406 may include pairs of keys and hashed passwords. A key may include an identifier, such as a user identifier. A hashed password may include either an old hash or a new hash.

Exemplary Process for Updating Stored Passwords

Figure 5A:
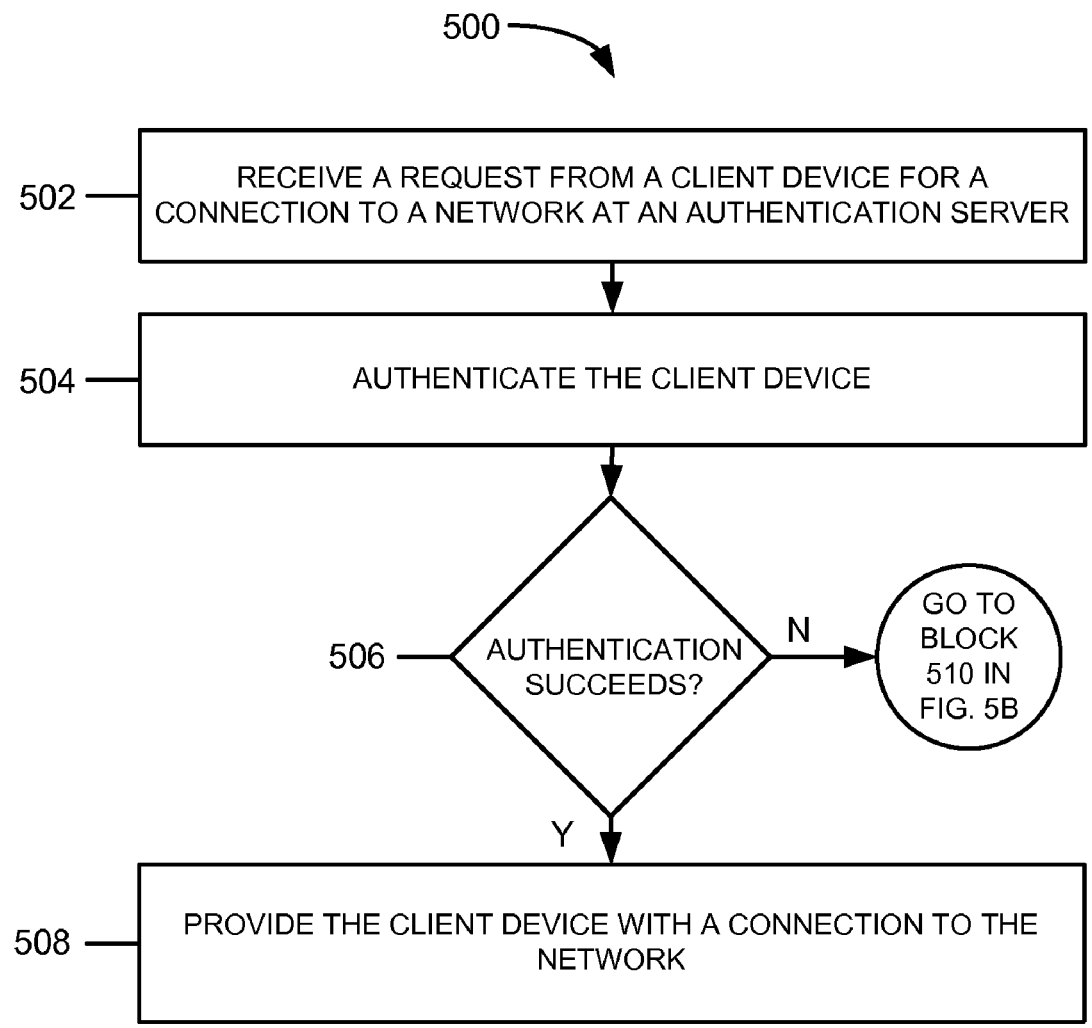
FIG. 5A is a flow diagram of a process for authenticating the client device of FIG. 1.
Figure 5B:
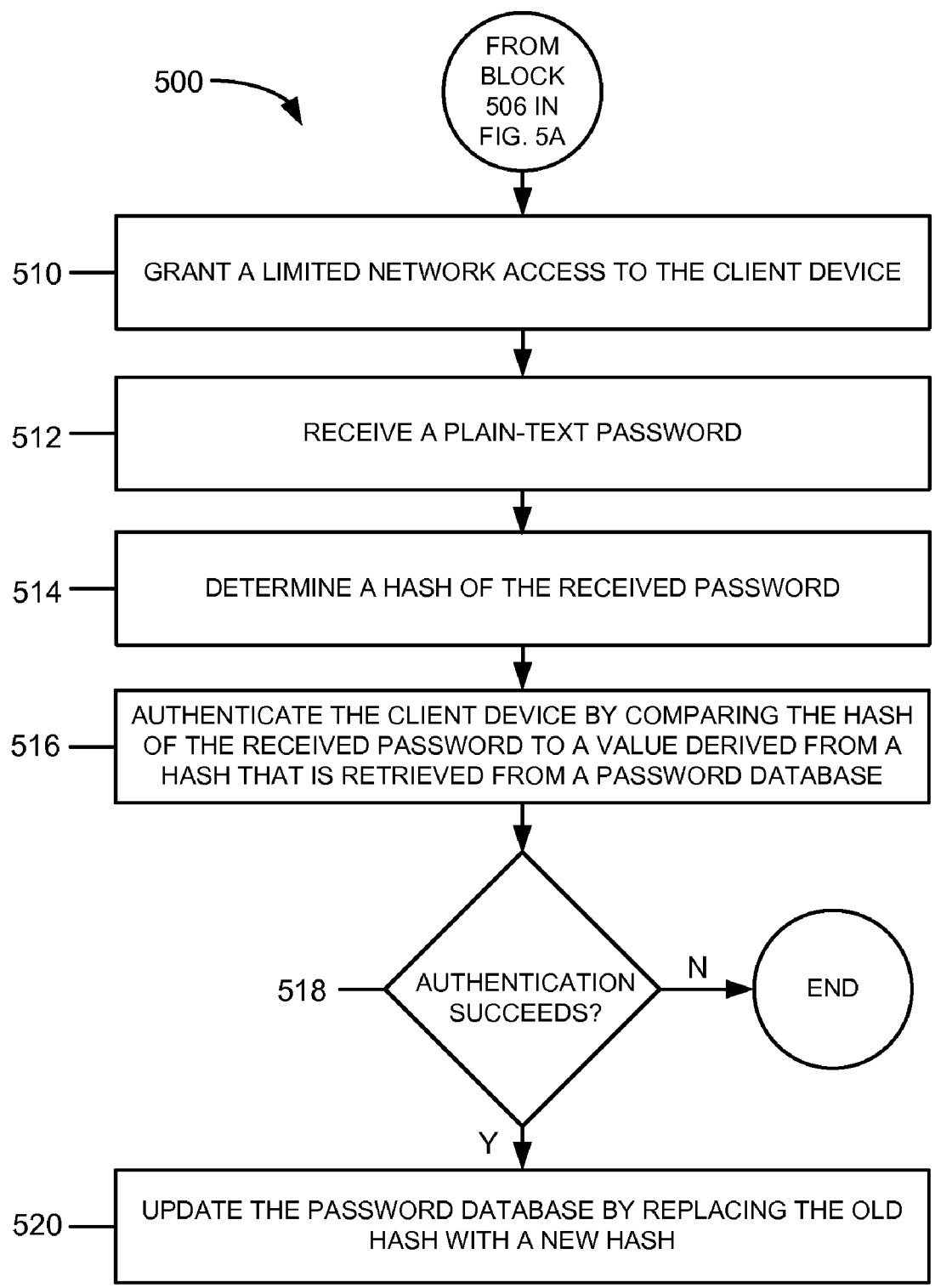
FIG. 5B is a flow diagram of a process for updating a stored password at the policy server device of FIG. 1.

The above paragraphs describe system elements that are related to devices and/or components for updating password storage formats. FIGS. 5A and 5B show exemplary process 500 that is capable of being performed by one or more of these devices and/or components.

FIG. 5A is a flow diagram of part of process 500, for authenticating client device 102. Assume that prior to starting process 500, authentication client 302 may or may not have been upgraded. If authentication client 302 has been upgraded, the upgrade may have been performed by installing a software update for authentication client 302. In one implementation, the upgrade may have been performed by downloading and installing a network copy of the software update for authentication client 302. The upgrade of authentication client 302 may change the hashing scheme used by authentication client 302.

Process 500 may begin at block 502, where a request for a connection to a network from NAD 106 may be received at authentication server 402 (FIG. 4) (block 502). The request may include parameters such as a user identifier and a hash of a password. The request may have been generated by NAD 106, based on the user identifier and/or the hash of a password that are received from client device 102. The hash may have been obtained by applying a hashing scheme (e.g., Message-Digest algorithm 5 (MD5)) to a challenge string from the policy server and the password, which, in turn, may or may not already have been a hash of a plain-text password.

Client device 102 may be authenticated (block 504). The authentication may be performed by comparing the hashed password in the request with a value derived from a hash that is retrieved from password database 406. The hash may be retrieved by using the identifier in the request as a key.

At block 506, if the authentication fails, process 500 may proceed to blocks 510 in FIG. 5B. The authentication may fail if the hashed password in the received request and the derived value are different. In a different implementation, if the authentication fails, a user may be presented with a choice of either returning to block 502 to supply another password or proceeding to block 510. If the authentication succeeds, client device 102 may be provided with a connection to network 104 (block 508).

Figure 6A:
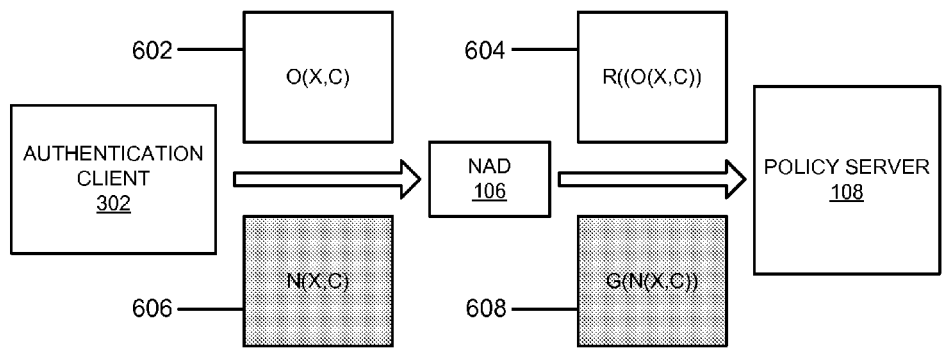
FIG. 6A illustrates an authentication process before and after upgrading an authentication client at the client device of FIG. 1.

At block 506, whether client device 102 is successfully authenticated may depend on if authentication client 302 at client device 102 has been upgraded since the last successful attempt by client device 102 to connect to network 104. FIG. 6A highlights the differences in the authentication process when authentication client 302 has not been and has been upgraded.

As illustrated in FIG. 6A, before the upgrade, authentication client 302 may provide a password $O(X,C)$ 602, where X is a plain-text password, C is a challenge string from the policy server device, and $O(\ )$ is a function that encodes or hashes the plain-text password X and the challenge string C. Note that O may involve computing a cryptographic hash of plain-text password X and then computing a second cryptographic hash of the cryptographic hash of the plain-text password X combined with challenge string C. Depending on the authentication scheme in use before the upgrade, challenge string C may not be specified. In addition, depending on the authentication scheme in use before the upgrade, $O(X,C)$ may be identical to X. At NAD 106, a transformation function $R(\ )$ may be applied to $O(X,C)$ 602 to produce $R(O(X,C))$ 604. The transformation function $R(\ )$ may hash, encrypt, or leave intact $O(X,C)$. As further shown in FIG. 6A, $R(O(X,C))$ 604 may be sent to policy server 108. At policy server 108, client device 102 may be authenticated by comparing $R(O(X,C))$ 604 to a value derived from a hash that is retrieved from password database 406. The authentication may succeed, as both $R(O(X,C))$ 604 and the value derived from the retrieved hash may be identical.

After the upgrade, authentication client 302 may provide password $N(X,C)$ 606, where $N(X,C)$ is a function that maps plain-text password X and challenge string C to a new hash. $N(\ )$ may involve computing a cryptographic hash of plain-text password X, and computing a second cryptographic hash of the cryptographic hash of plain-text password X, combined with challenge string C. Depending on the authentication scheme in use after the upgrade, challenge string C may not be specified. In addition, depending on the authentication scheme in use after the upgrade, $O(X,C)$ may be identical to X. At NAD 106, a transformation function GO may be applied to $N(X,C)$ 606 to produce $G(N(X,C))$ 608. In one implementation, NAD 106 may employ GO in place of $R(\ )$ when NAD 106 recognizes the upgrade of authentication client 302 (e.g., via messages received), and modify its transformation function from $R(\ )$ to GO. In some implementations, $G(N(X,C))$ may not further encode $N(X,C)$, but merely preserve $N(X,C)$. That is, $G(N(X,C))$ may equal $N(X,C)$.

NAD 106 may send $G(N(X,C))$ 608 to policy server 108. Policy server 108 may perform an authentication of client device 102 by comparing $G(N(X,C))$ 608 to a value derived from a hash retrieved from password database 406. The authentication may fail, as the value derived from the hash retrieved form password database 406 may not be identical to $G(N((X,C))$ 608, but to $R(O(X,C))$ 604.

FIG. 5B is a flow diagram of part of process 500 for updating a password at policy server device 108. At block 510, a limited network access may be granted to client device 102. In one implementation, the limited network access may be granted by policy server device 108. In other implementations, the limited network access may be granted by other devices and/or components that may be included in network 104.

The purpose of granting the limited network access may be to allow client device 102 to create a temporary channel (e.g., a secure HTTP connection) between client device 102 and policy server device 108 and to allow client device 102 to send a plain-text password to policy server device 108. Without the limited network access and the temporary channel, when a password is sent from client device 102 to policy server 108, NAD 106 may prevent the password from being relayed to policy server device 108 or may hash or encrypt the password and prevent the password from arriving at policy server device 108 in plain-text.

The limited network access may be granted in various ways. For example, policy server device 108 may place client device 102 on a VLAN via NAD 106. In another example, policy server device 108 may cause NAD 106 to grant client device 102 the limited network access, by sending an access control list (ACL) to NAD 106.

A plain-text password may be received (block 512). The password may be provided by client device 102 over the temporary channel that is established between client device 102 and policy server 108. In one implementation, the user may launch a web browser and provide the password in the plain-text in HTML over a secure HTTP (HTTPS) connection between client device 102 and re-authentication server 404.

Figure 6B:
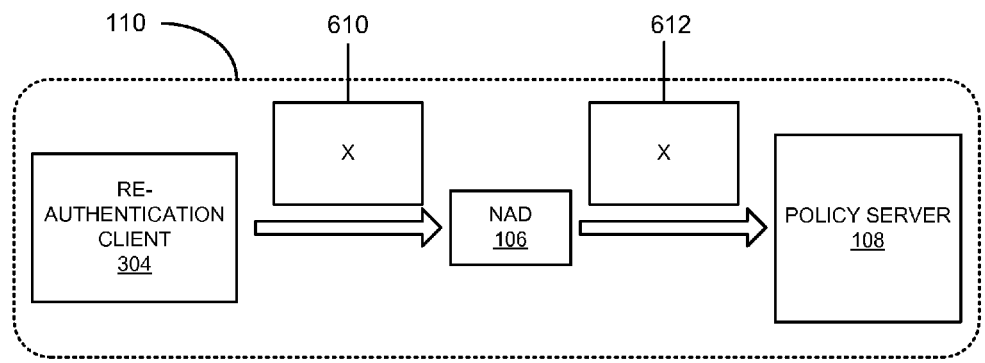
FIG. 6B is a diagram illustrating exemplary flow of a password through devices of FIG. 1.

FIG. 6B shows the flow of plain-text password X 610. As shown, re-authentication client 304 may provide plain-text password X 610. NAD 106 may not hash messages that are exchanged over the temporary channel, and therefore, plain-text password X 612 is in the same format as password X 610.

Figure 6C:
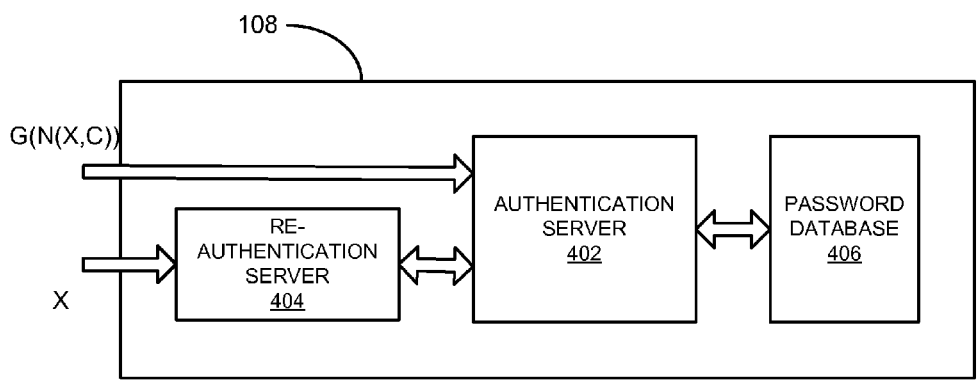
FIG. 6C is a diagram illustrating exemplary flow of passwords through components of the policy server device of FIG. 1.

FIG. 6C highlights the difference between how the plain-text password and a new hash (e.g., a password that is produced by authentication client 302 after the upgrade) may be received at policy server device 108. As shown, G(N(X,C)), a new hash, is received at authentication server 402. In contrast, the plain-text password is received at re-authentication server 404.

Returning to FIG. 5B, at block 514, a hash of the received password may be determined. In one implementation, the hash may be determined by applying O( ) to the plain-text password X and challenge string C and R( ) to O(X,C). Both O( ) and R( ) may be known to re-authentication server 404 and/or authentication server 402.

The client device may be authenticated by comparing the hash of the received password to a value derived from a hash that is retrieved from password database 406 (block 516). If the received hash and the value derived from the retrieved hash are identical, the authentication may succeed; otherwise, the authentication may fail.

At block 518, if the authentication fails, process 500 may terminate. In a different implementation, process 500 may return to block 510 if client device 102 has not exhausted a particular number of times client device 102 is permitted to input a plain-text password. If client device 102 has failed to supply the correct password within the particular number of tries, process 500 may terminate.

If the authentication succeeds, password database 406 may be updated by replacing the old hash (e.g., one that may be used by policy server 108 to compute R(O(X,C)) with the new hash (e.g., one that may be used by policy server 108 to compute G(N(X,C)) (block 520). The new hash may be determined based on the plain-text password X, N( ), and G( ).

After block 520 completes, if client device 102 requests policy server 108 to provide a new connection to network 104, authentication server 402 may successfully authenticate client device by comparing a hash from client device 102 to a value derived from the new hash retrieved from updated password database 406, provided that the hash from client device 102 is generated based on a correct password.

Example

Figure 7A:
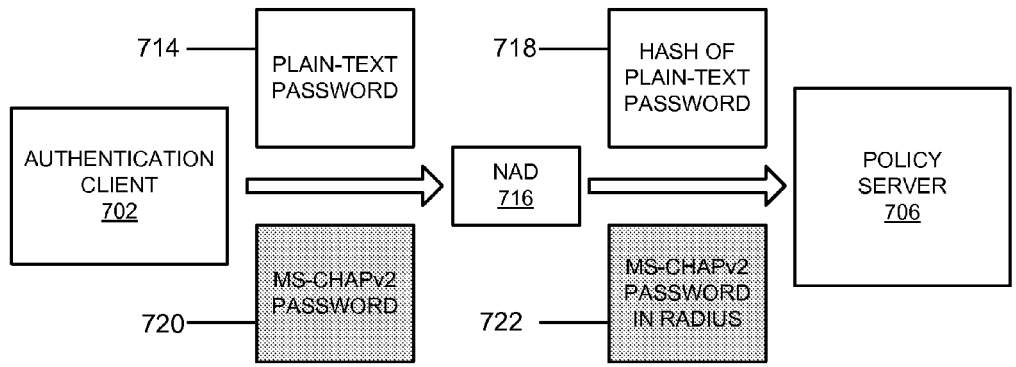
FIG. 7A illustrates an authentication process before and after upgrading an authentication client that sends plain-text passwords over Institute of Electrical and Electronics Engineers (IEEE) 802.1x with an authentication client that sends a Microsoft-Challenge Handshake Authentication Protocol Version 2.0 (MSCHAPv2) password over IEEE 802.1x.
Figure 7B:
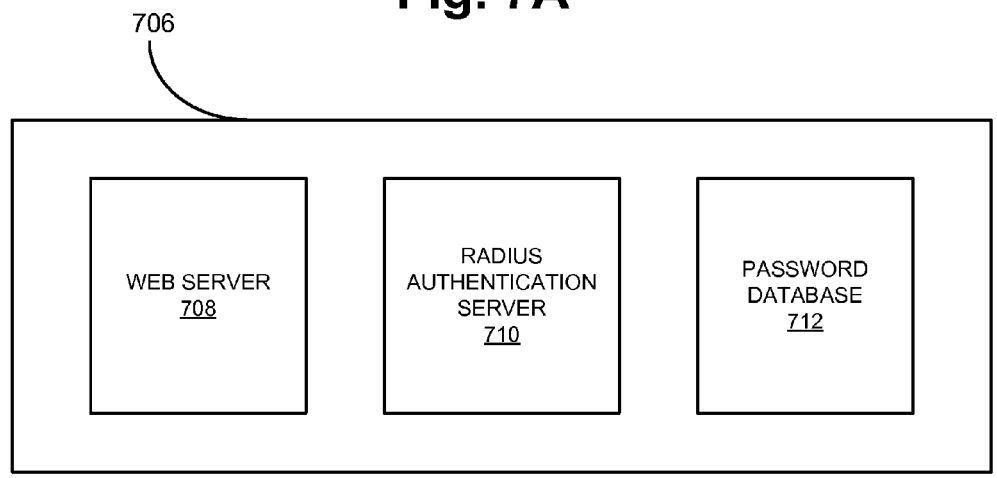
FIG. 7B is a block diagram of an embodiment of the policy server device of FIG. 1.
Figure 7C:
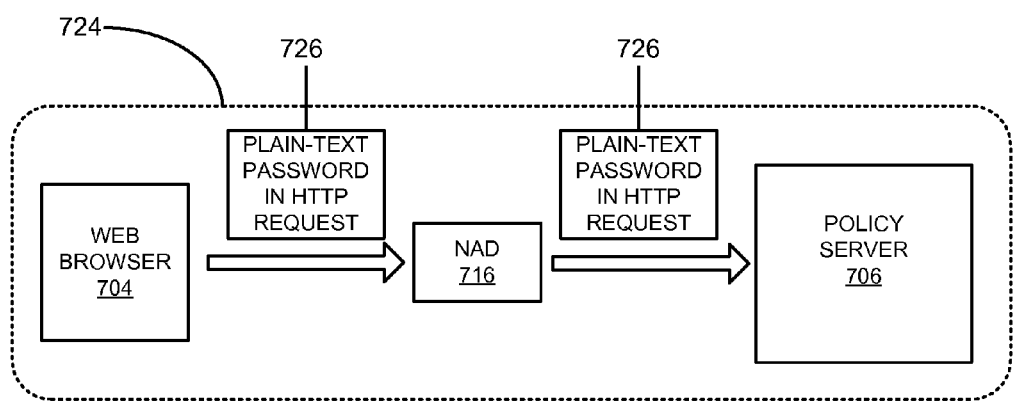
FIG. 7C is a diagram illustrating exemplary flow of a password in a VLAN.

The following example illustrates a process for updating stored passwords, with reference to FIGS. 7A-7C. The example is consistent with the exemplary process described above with reference to FIGS. 5A and 5B.

In the example, as illustrated in FIGS. 7A-7C, assume that client device 102 includes an authentication client 702. Also, assume that client device 102 includes a web browser 704 (FIG. 7C) as its re-authentication client. In addition, assume that policy server 706 includes a web server 708 as its re-authentication server, a RADIUS authentication server 710 as its authentication server, and a password database 712 (FIG. 7B). Furthermore, assume that authentication client 702 prior to an upgrade sends plain-text passwords and authentication client 702 after the upgrade is compliant with MSCHAPv2.

Prior to the upgrade, when authentication client 702 attempts to obtain a connection to a network to which policy server 706 may grant access, authentication client 702 sends a plain-text password 714 and a user identifier. When RADIUS authentication server 710 receives plain-text password 714, RADIUS authentication server 710 generates the hash 718 of plain text password 714. Provided that the password is correct, the authentication succeeds, as hash 718 matches a hash that is retrieved from RADIUS password database 712.

After the upgrade, when authentication client 702 attempts to obtain a connection to the network, authentication client 702 uses EAP-MSCHAPv2 to send a cryptographic hash of a cryptographic hash of the password combined with a challenge string to RADIUS authentication server 710. RADIUS authentication server 710 performs an authentication. The authentication fails. The hash that is stored in password database 712 does not produce the same value computed by authentication client 702, because the hash stored in password database 712 is produced by a different algorithm than the algorithm used for hashing passwords in EAP-MSCHAPv2.

After the authentication failure, policy server device 706 instructs NAD 716 to place authentication client 702 on VLAN 724, and a user at the client device sends a plain-text password in HTTP request 726 via browser 704. Browser 704 transmits plain-text password in HTTP request 726 to NAD 716, which relays the plain-text password in HTTP 726 to web server 708 in policy server device 706.

Web server 708 computes hash 718 of the plain-text password and compares the computed hash to the hash in password database 712. The hash of the plain-text password matches the retrieved hash, and RADIUS authentication server 710 succeeds in authenticating client device 102. Furthermore, password database 712 is updated with a different hash of the password using the algorithm for hashing password from MSCHAPv2. After database 712 has been updated, subsequent authentication attempts by client device 102 using EAP-MSCHAPv2 may succeed.

In the above, the server-side mechanism for updating the password may be constructed using server applications and components, such as a telnet server, a web server, etc., and/or other types of server-side resources (e.g., a login script, a web page, etc.). By using such components (e.g., web server), the mechanism may be implemented inexpensively.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks have been described with regard to the process illustrated in FIGS. 5A and 5B, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A system comprising:
   an authentication server device to:
      receive a first form of a password from a client device according to an authentication protocol, and
      authenticate the client device based on a comparison of the first form of the password to a value, derived from a second form of the password and stored in a password database, where the authentication server fails to authenticate the client device when the first form of the password is different than the value derived from the second form of the password; and
   a server device to:
      establish, when, based on the comparison, the authentication server device fails to authenticate the client device, a secure connection between a quarantine network and the client device,
      receive a plain-text password from the client device over the secure connection,
      authenticate the client device based on comparing a value derived from the plain-text password with the value derived from the second form of the password,
      update, when the client device is authenticated, the password database with a third form of the password that enables the authentication server device to successfully authenticate the client device based on the first form of the password,
      receive, after updating the password database with the third form of the password, a subsequent first form of the password, from the client device,
      retrieve the third form of the password from the password database
      derive a second value from the third form of the password,
      compare the subsequent first form of the password to the second value, and
      authenticate the client device based on comparing the subsequent first form of the password to the second value.

2. The system of claim 1, where the first form of the password is the same as the third form of the password.

3. The system of claim 1, where one or more of the first form of the password and the third form of the password include one of:
   a cryptographic hash of the plain-text password; or
   a cryptographic hash of a combination of the plain-text password and a challenge string.

4. The system of claim 1, where the authentication server device is further to:
   derive the value from the second form of the password, where when deriving the value, the authentication server device is to compute a cryptographic hash of a combination of the second form of the password and a challenge string.

5. The system of claim 1,
   where the server device includes:
      a web server to receive the plain-text password from a browser of the client device.

6. The system of claim 1, where the authentication server device includes one of:
   a remote authentication dial-in user service (RADIUS) authentication server; or
   a Diameter authentication server.

7. The system of claim 1, where the authentication server device is further to:
   receive a request for a communication link to a network from the client device; and
   send a password challenge in response to the request, where the first form of the password is received in response to the password challenge.

8. The system of claim 7, where the communication link includes:
   a point-to-point communication link.

9. The system of claim 1, where the authentication protocol includes:
   an extensible authentication protocol (EAP).

10. The system of claim 1, where the secure connection includes:
    a secure hypertext transfer protocol (HTTPS) connection.

11. A method comprising:
    receiving a first form of a password from a client device;
    retrieving a second form of the password from a password database;
    deriving a value from the second form of the password;
    comparing the first form of the password to the derived value;
    establishing, when, based on the comparing, the first form of the password and the derived value are determined to be different, a secure connection between the client device and a quarantine network;
receiving a plain-text password, from the client device, over the secure connection;
authenticating the client device based on comparing a value derived from the plain-text password with the value derived from the second form of the password;
replacing, when the client device is authenticated, the second form of the password in the password database with a third form of the password that enables the client device to be authenticated based on the first form of the password;
receiving, after replacing the second form of the password with the third form of the password, a subsequent first form of the password, from the client device; retrieving the third form of the password from the password database;
deriving a second value from the third form of the password;
comparing the subsequent first form of the password to the second value; and
authenticating the client device based on comparing the subsequent first form of the password to the second value.

12. The method of claim 11, further comprising:
receiving a request from the client device to access a point-to-point connection to a network.

13. The method of claim 11, where receiving the subsequent first form of the password includes:
receiving the subsequent first form of the password from a network access device that receives the plain-text password from the client device.

14. The method of claim 11, where the subsequent first form of the password comprises a cryptographic hash of the plain-text password and a challenge string.

15. The method of claim 14, where the cryptographic hash is computed by the client device.

16. The method of claim 14, where the cryptographic hash is computed by a network access device.

17. The method of claim 11, where receiving the first form of the password includes:
receiving the first form of the password based on an extensible authentication protocol (EAP).

18. A non-transitory computer-readable medium containing instructions executable by one or more devices, the computer-readable medium comprising:
one or more instructions to receive a first form of a password,
one or more instructions to determine, based on comparing a value derived from the first form of the password with a value derived from a second form of the password, whether to authenticate the client device, where the second form is stored in a memory associated with the device,
one or more instructions to establish a connection between the client device and a quarantine network when the client device is not authenticated based on comparing the first form of the password to the value derived from the second form of the password,
one or more instructions to receive, in response to establishing the connection, a plain-text password from the client device over the connection,
one or more instructions to authenticate the client device based on comparing a value derived from the plain-text password with the value derived from the second form of the password,
one or more instructions to overwrite, when the client device is authenticated, the second form of the password, in the memory, with a third form of the password,
one or more instructions to subsequently receive the first form of the password,
one or more instructions to compare the subsequently received first form of the password to a value derived from the third form of the password, and
one or more instructions to authenticate the client device based on comparing the subsequently received first form of the password to the value derived from the third form of the password.

* * * * *

UNITED STATES PATENT AND TRADEMARK OFFICE
CERTIFICATE OF CORRECTION

| | | |
|---|---|---|
| PATENT NO. | : 8,094,812 B1 | Page 1 of 1 |
| APPLICATION NO. | : 11/864598 | |
| DATED | : January 10, 2012 | |
| INVENTOR(S) | : Andy Tsang et al. | |

It is certified that error appears in the above-identified patent and that said Letters Patent is hereby corrected as shown below:

Claim 1 (Column 10, line 11) after "database" insert a --,--.

Signed and Sealed this
Fourteenth Day of February, 2012

David J. Kappos
*Director of the United States Patent and Trademark Office*